(12) United States Patent
Dobler et al.

(10) Patent No.: US 11,584,622 B2
(45) Date of Patent: Feb. 21, 2023

(54) LOADING OF A LOAD WITH A CRANE SYSTEM

(71) Applicant: Siemens Aktiengesellschaft, Munich (DE)

(72) Inventors: Thomas Dobler, Hatzenbühl (DE); Julian Vogel, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 317 days.

(21) Appl. No.: 16/898,042

(22) Filed: Jun. 10, 2020

(65) Prior Publication Data
US 2020/0391981 A1 Dec. 17, 2020

(30) Foreign Application Priority Data
Jun. 11, 2019 (EP) .................................... 19179438

(51) Int. Cl.
| | | |
|---|---|---|
| *B66C 13/48* | (2006.01) | |
| *B65G 67/04* | (2006.01) | |
| *G06K 9/62* | (2022.01) | |
| *G06T 1/00* | (2006.01) | |
| *G06V 10/22* | (2022.01) | |
| *G06V 20/56* | (2022.01) | |

(52) U.S. Cl.
CPC .............. *B66C 13/48* (2013.01); *B65G 67/04* (2013.01); *G06K 9/6256* (2013.01); *G06T 1/0014* (2013.01); *G06V 10/225* (2022.01); *G06V 20/56* (2022.01)

(58) Field of Classification Search
CPC ....... B66C 13/085; B66C 13/46; B66C 13/48; G06K 9/6256; G06T 1/0014; G06V 10/225; G06V 20/56
See application file for complete search history.

(56) References Cited

U.S. PATENT DOCUMENTS

2003/0191555 A1  10/2003  Takehara et al.
2004/0215367 A1  10/2004  King et al.
(Continued)

FOREIGN PATENT DOCUMENTS

CN   102115010 A   7/2011
CN   105431370 A   3/2016
(Continued)

OTHER PUBLICATIONS

Qiu, Gang et al : "A Vehicle License Plate Location Algorithm Based on Image Edge Features and Neural Network ", "Microcomputer Development", vol. 15, No. 4, pp. 30-32, 1-15, Apr. 30, 2005.

*Primary Examiner* — Ming Wu
(74) *Attorney, Agent, or Firm* — Henry M. Feiereisen LLC (57) ABSTRACT

For the automated loading of a load by a crane system, a camera system of the crane system generates at least one image data stream. The at least one image data stream is analyzed by a computer unit with the assistance of an artificial neural network. On the basis of the analysis, a first marker and a second marker are recognized by the computer unit in respective single images of the at least one image data stream. Positions of the markers are determined, and the load is loaded automatically by a lifting device of the crane system dependent upon the positions of the markers.

16 Claims, 2 Drawing Sheets

(56) References Cited

U.S. PATENT DOCUMENTS

| | | |
|---|---|---|
| 2014/0205141 A1 | 7/2014 | Gao et al. |
| 2016/0167932 A1 | 6/2016 | Holmberg et al. |
| 2019/0055111 A1* | 2/2019 | Cranney, III ............ B66C 23/88 |
| 2019/0062130 A1* | 2/2019 | Benton ................. B66C 23/905 |
| 2019/0135538 A1* | 5/2019 | Nakanishi ............ B65G 1/0421 |
| 2019/0152600 A1* | 5/2019 | Kuk ........................ B66C 13/08 |

FOREIGN PATENT DOCUMENTS

| | | |
|---|---|---|
| CN | 106966298 A | 7/2017 |
| CN | 108648233 A | 10/2018 |
| EP | 3000762 A1 | 3/2016 |
| JP | 2008168952 A | 7/2008 |
| JP | 2018080054 A | 5/2018 |
| KR | 20050018654 A | 2/2005 |
| KR | 20150110697 A | 10/2015 |
| WO | WO 2019104251 A1 | 5/2019 |

* cited by examiner

LOADING OF A LOAD WITH A CRANE SYSTEM

CROSS-REFERENCES TO RELATED APPLICATIONS

This application claims the priority of European Patent Application, Serial No. 19179438.7, filed Jun. 11, 2019, pursuant to 35 U.S.C. 119(a) (d), the disclosure of which is incorporated herein by reference in its entirety as if fully set forth herein.

BACKGROUND OF THE INVENTION

The present invention relates to a method for loading a load with a crane system, to a crane system for loading of a load, and to a computer program.

The following discussion of related art is provided to assist the reader in understanding the advantages of the invention, and is not to be construed as an admission that this related art is prior art to this invention.

In container terminals, freight trains and trucks are loaded, in particular loaded and unloaded. Hereby, a crane operator manually controls a lifting device of a crane.

It would be desirable and advantageous to provide an improved loading and unloading process which obviates prior art shortcomings and which is efficient, economic and safe.

SUMMARY OF THE INVENTION

According to one aspect of the present invention, a method for loading of a load with a crane system includes generating at least one image data stream by a camera system of the crane system, analyzing the at least one image data stream by a computer unit of the crane system on the basis of an artificial neural network, in response to the analysis of the at least one image data stream by the computer unit, recognizing is first marker in a first single image of the at least one image data stream and recognizing a second marker in a second single image of the at least one image data stream, determining by the computer unit a position of the first marker and a position of the second marker, and automatically loading the load by a lifting device of the crane system dependent upon the positions of the first and second markers.

The present invention resolves prior art problems by providing a camera system to image a transport vehicle that is to be loaded or unloaded, and by analyzing the camera data using an artificial neural network. By means of pre-defined markers, for the recognition of which the neural network. In particular, has been trained, a lifting device is controlled for automatic loading of the load. A method according to the present invention thus enables automated loading of the load.

In accordance with a method of the present invention, a camera system of the crane system creates at least one image data stream. The computer unit of the crane system continuously, periodically and/or repeatedly analyzes the at best one image data stream with the assistance of an artificial neural network, in particular, trained artificial neural network. By means of the computer unit, on the basis of the analysis, a first marker is recognized in a first single image of the at least one image data stream and a second marker is recognized in a second single image of the at least one image data stream. The computer unit determines a position of the first marker and a position of the second marker, and the load is loaded automatically by the lifting device of the crane system, dependent upon the positions of the first and second markers.

As used in the specification and claims, the term "image data stream" is intended to relate to a temporal sequence of a plurality of single images which can also be designated frames. In particular, the single images can be recorded at a pre-defined sampling rate whereby the sampling rate can be, for example, in a range of 10 ms to 10 s, for example, in the order of magnitude of 100 ms or approximately 100 ms. The image data stream may thus involve a video stream for example.

The camera system generates the at least one image data stream, in particular by imaging one or more target regions of the camera system in a vicinity of the crane system. The target regions may, advantageously, lie in a region in which a transport vehicle, which is to be loaded or unloaded in accordance with a method of the invention, is situated for this purpose.

The artificial neural network involves, in particular, a neural network which has been trained for pattern recognition in image data. For example, this can be a "convolutional neural net" (CNN).

That the at least one image data stream is analyzed with the assistance of the neural network can be understood, for example, in that any image data stream contained in the at least one image data stream is analyzed, whereby for the analysis, each single image of the corresponding image data stream is analyzed, i.e. a pattern recognition in particular is carried out for each of the single images.

The first and the second markers can advantageously be situated at or on the transport vehicle. This may involve components that are firmly installed in or fastened onto the transport vehicle, e.g. functional components. Alternatively or additionally, the markers can also be provided in a dedicated way for the purpose of pattern recognition.

That the first and the second markers are recognized in the respective single image by means of the analysis can be understood in that on the basis of the analysis by the neural network, a pre-defined and/or learned pattern is present in the respective single image, wherein the pattern has been pre-defined or learned, in particular, by training the neural network.

The first and the second markers can be situated at different positions of the transport vehicle, e.g. on opposite ends of the transport vehicle. The designation "end" of the transport vehicle thereby relates to a longitudinal direction or longitudinal axis of the transport vehicle. In particular, the first marker can be situated on a first longitudinal end of the transport vehicle and the second marker can be situated on a second longitudinal end of the transport vehicle lying opposite the first longitudinal end.

The term "longitudinal direction of the transport vehicle" can be understood, for example, as a direction along which the transport vehicle can move, in particular when a steering system of the transport vehicle is in a neutral setting.

The transport vehicle may involve, for example, a truck, a trailer, a semi-trailer, or a train wagon. In the case of a train wagon, for example, rails can be provided on which the train wagon can be moved into the target region or out of the target region. In this case, the longitudinal axis of the transport vehicle corresponds, in particular, to an orientation or longitudinal direction of the rails.

The load may involve a receptacle, such as a container, e.g. a sea freight container according to the standard ISO 668 (sixth edition, 2013) for example, The transport vehicle may involve any vehicle which is to be loaded or unloaded by a crane or crane system and which is able to transport the load after the loading or before the unloading.

The neural network may involve, in particular, a software module which is stored on the computer unit.

The positions of the first and second markers are, in particular, respective real positions, i.e. absolute positions, given by corresponding coordinates in relation to a pre-defined coordinate system which is connected, in particular, to a frame of the crane system or a base on which the transport vehicle is situated. The position of the respective marker can be unambiguously defined by a position of the camera system in relation to the pre-defined coordinate system and an arrangement or relative position of the marker within the single image. As an approximation, the position of the marker alone can be defined by the respective position of the camera system.

The lifting device may involve a container spreader and can also be referred to as a load receiving means or spreader. In particular, the lifting device includes a gripping device by means of which the load, e.g. the container, can be gripped and lifted from the transport vehicle or can be placed on the transport vehicle.

The lifting device can include a frame, e.g. a telescopic frame which can be extended and/or set according to a length of the container. Gripping elements of the lifting device can engage and be locked, for example, in corresponding corner fittings of the container.

That the load is loaded automatically by means of the lifting device can be understood to mean, in particular, that at least one operating parameter of the lifting device or of the crane system is set autonomously without any manual engagement, by the crane system dependent upon the positions of the markers, in order to load the load. For example, loading can be implemented fully automatically, i.e. without any intervention by an operator.

Settings of the crane system, in particular of the lifting device, for loading the load can be configured to be partly or fully automatic. In particular, the positions of the markers are determined fully automatically from the at least one image data stream. Loading of the load can thus be realized at least partly automatically or optionally fully automatically and therefore particularly efficiently, in a time-saving and cost-saving manner and with enhanced safety.

Through the use of the neural network, a recognition and position determination of the markers is possible with a high degree of reliability, so that a high level of automation can be enabled. Further advantages of employing a neural network are its individual trainability, i.e. its specific adaptation to the optical appearance of the markers, or pre-defined pattern and its high speed during pattern recognition.

According to another advantageous feature of the present invention, the computer unit with the assistance of the analysis unit can be configured to recognize a third marker in a third single image of the at least one image data stream and to recognize a fourth marker in a fourth single image. By means of the computer unit, the positions of the third and fourth markers are determined. The load is loaded by means of the lifting device dependent upon the positions of the first, second, third and fourth markers.

The additional recognition and evaluation of the third and fourth markers enhances reliability of the process, and achieves increased speed or redundancy and thereby an enhanced level of safety. The above statements regarding the first and second markers apply analogously for the third and fourth markers.

According to another advantageous feature of the present invention, the camera system can be moved during the generation of the at least one image data stream along the longitudinal direction of the transport vehicle. The position of the first marker can be determined by means of the computer unit dependent upon a first momentary position of the camera system when the first marker has been recognized. The position of the second marker can be determined by means of the computer unit dependent upon a second momentary position of the camera system when the second marker has been recognized.

According to another advantageous feature of the present invention, the crane system can include a control system and a drive system, wherein the control system can control the drive system for moving the camera system. The computer unit is hereby advantageously coupled to the control system.

During movement of the camera system along the longitudinal direction for generating the at least one image data stream, the transport vehicle can be stationary, particularly in relation to the pre-defined coordinate system.

A momentary position of the camera system can be understood, in particular, as a position of the camera system, in particular with regard to the pre-defined coordinate system, at a time point of the recognition of the respective marker. For example, each single image of the at least one image data stream can be assigned to a time stamp. The momentary position then corresponds, for example, to the position of the camera system at a time point that is given by the time stamp of the respective single image in which the corresponding marker was recognized.

The first and second momentary positions can correspond, for example, to respective positions of different components or constituents of the camera system.

According to another advantageous feature of the present invention, the camera system can have one camera per image data stream of the at least one image data stream. The first momentary position of the camera system then corresponds, for example, to a momentary position of the camera by which the first marker was recognized. Accordingly, the second momentary position is given, for example, by a momentary position of the camera by means of which the second marker was recognized.

The transport vehicle is therefore scanned by the camera system. Advantageously, the markers can be sought in this way, so that there is no need to necessarily know an exact position of the transport vehicle at the beginning of the method or a type or a length of the transport vehicle or an extent of the load at the beginning of the process. Accordingly, an increased level of automation is rendered possible.

Provision may also be made for determining the position of the markers solely by the corresponding momentary position of the camera system. When a corresponding accuracy is sufficient for the position determination for the particular use, the need e.g. for a determination of the arrangement of the respective marker within the respective single image in order to determine the position of the markers can be dispensed with.

According to another advantageous feature of the present invention, a first image data stream of the at least one image data stream can be generated by a first camera of the camera system arranged at a first end of the lifting device. For the analysis of the at least one image data stream, the first image data stream is analyzed by the computer unit with the assistance of the neural network. The first marker can be recognized by the computer unit on the basis of the analysis of the first image data stream in the first single image.

Thereby, the first momentary position corresponds to a momentary position of the first camera.

The first end of the lifting device may advantageously involve a first longitudinal end, i.e. a first end in relation to a longitudinal direction of the lifting device. The longitudinal direction of the lifting device can correspond or approximately correspond, in particular during the process or during the scanning, to the longitudinal direction of the transport vehicle for example.

The first single image is, for example, a single image of the first image data stream.

According to another advantageous feature of the present invention, a second image data stream of the at least one image data stream can be generated by a second camera of the camera system arranged at a second end of the lifting device opposite to the first end of the lifting device. For the analysis of the at least one image data stream, the second image data stream is analyzed by the computer unit with the assistance of the neural network. The second marker can be recognized by the computer unit on the basis of the analysis of the second image data stream in the second single image. Thereby, the second momentary position corresponds to a momentary position of the second camera.

The second single image is, in particular, a single it of the second image data stream.

As each of the markers is determined by a separate camera, the scan procedure can be accelerated since the overall transport vehicle does not have to be scanned, i.e. the camera system does not have to be moved over the entire length of the transport vehicle.

According to another advantageous feature of the present invention, a third image data stream of the at least one image data stream can be generated by a third camera of the camera system arranged at the first end of the lifting device. The third image data stream can be analyzed by the computer unit with the assistance of the neural network. The third marker can be recognized by the computer unit on the basis of the analysis of the third image data stream in the third single image. The position of the third marker can be determined by the computer unit dependent upon a third momentary position of the camera system, which corresponds to a momentary position of the third camera when the third marker has been recognized.

According to another advantageous feature of the present invention, a fourth image data stream of the at least one image data stream can be generated by a fourth camera of the camera system arranged at the second end of the lifting device. The fourth image data stream can be analyzed by the computer unit with the assistance of the neural network and the first marker can be recognized by the computer unit on the basis of the analysis of the fourth image data stream in the fourth single image. The position of the fourth marker can be determined by the computer unit dependent upon a fourth momentary position of the camera system, which corresponds to a momentary position of the fourth camera when the fourth marker has been recognized.

As a result, two markers can be recognized at each longitudinal end of the transport vehicle. Thereby, the recognition of the third and fourth markers can be regarded, for example, as redundant to the recognition of the first or the second marker. In this way stability and reliability of the process can be enhanced.

According to another advantageous feature of the present invention, the first marker can include a buffer or buffer plate of the transport vehicle, in particular when the transport vehicle is configured as a train wagon or includes such a train wagon. Alternatively or additionally, the first marker can contain a load fixing means with which, for example, a container placed on the transport vehicle can be fixed or positioned. Such load fixing means can also be referred to as pins.

According to another advantageous feature of the present invention, the buffer and/or the load fixing means can be recognized as the first marker on the basis of the analysis of the at least one image data stream, in particular, the first image data stream with the assistance of the neural network.

According to another advantageous feature of the present invention, the second marker can include a further buffer of the transport vehicle and/or a further load fixing means of the transport vehicle.

According to another advantageous feature of the present invention, the further buffer and/or the further load fixing means of the transport vehicle can be recognized as the second marker on the basis of the analysis of the at least one image data stream, in particular, the second image data stream with the assistance of the neural network.

Corresponding embodiments arise directly also for the third and/or fourth marker.

The individual markers can therefore include a buffer or a load fixing means or a combination of buffer and load fixing means.

The use of buffers for the markers has the particular advantage that train wagons as transport vehicles usually have such buffers. In addition, the buffers are always arranged at respective longitudinal ends of the train wagon, so that they are particularly suitable as markers. Furthermore, the geometrical form of the buffers of train wagons is comparatively uniform. In addition, it has been found that neural networks are well suited to recognizing buffers in the image data streams.

The use of load fixing means for the buffers has the particular advantage that transport vehicles for the transport of containers usually have such load fixing means in order to fix the containers or to position them in a defined manner. The load fixing means are also advantageously usually located on respective longitudinal ends of train wagons or truck trailers. The load fixing means can also be reliably recognized with the assistance of the neural network.

The neural network can be trained, in particular, for recognizing buffers and/or load fixing means in the image data streams.

According to another advantageous feature of the present invention, the position of the first marker can be determined by the computer unit dependent upon an arrangement of the first marker in the first single image.

According to another advantageous feature of the present invention, the position of the second marker can be determined by the computer unit dependent upon an arrangement of the second marker in the second single image.

According to another advantageous feature of the present invention, the position of the third marker can be determined by the computer unit dependent upon an arrangement of the third marker in the third single image and/or the position of the fourth marker can be determined by the computer unit dependent upon an arrangement of the fourth marker in the fourth single image.

An arrangement of one of the markers in the respective single image can be understood to be the corresponding representation of the respective marker in the corresponding single image. The arrangement or the position of the representation of the marker in the single image can be determined after or during the recognition of the marker, for example with the assistance of the neural network or on the basis of a further software module of the computer unit.

Embodiments in which the position of the respective marker is determined dependent upon its arrangement in the single image are advantageous, in particular, in combination with embodiments in which the respective momentary position of the camera system is used for determining the position of the marker. In particular, through the combination of the momentary position of the camera system with the arrangement of the respective marker in the corresponding single image, the position of the corresponding marker in relation to the pre-defined coordinate system can be determined with greater accuracy.

According to another advantageous feature of the present invention, on the basis of the positions of the first and second markers, a spacing or a first spacing of the first and second markers from one another can be determined by the computer unit. The load is loaded by the lifting device dependent upon the spacing.

The spacing represents, in particular, a spacing along the longitudinal axis of the transport vehicle.

When one of the markers contains a plurality of objects, for example, a buffer and a load fixing means, then the position of the marker can also be defined unambiguously. For example, this may involve the position of one of the two objects or a mean position of the objects.

According to another advantageous feature of the present invention, on the basis of the positions of the third and fourth markers, a further or second spacing of the third and fourth markers from one another can be determined by the computer unit. The load is loaded by the lifting device dependent upon the further spacing.

The determination of the further spacing can be regarded, for example, as redundant for determining the spacing.

According to another advantageous feature of the present invention, on the basis of the positions of the first and fourth markers, a third spacing of the first and fourth markers from one another can be determined and/or on the basis of the positions of the second and third markers, a fourth spacing of the second and third markers from one another can be determined. The load is loaded by the lifting device dependent upon the first, second, third and/or the fourth spacing.

One of the four spacings may be sufficient to load the load automatically by the lifting device. This enhances reliability of the process even in the case that individual markers are not recognized, as at least one of the spacings can still be determined and used for automated loading.

According to another advantageous feature of the present invention, the computer unit can be configured, on the basis of at least one of the spacings, to determine a type of the transport vehicle and/or the load, in particular a length of the transport vehicle and/or the load. In addition, the spacing can be used to determine a height of the load or the combination of transport vehicle and load.

On the basis of corresponding norm stipulations, the determined spacings can be used to unambiguously determine the corresponding wagon type or the type of the load. Optionally, for unambiguous determination, further information from the analysis of the at least one image data stream can also be used, for example, the arrangement of the load fixing means on the transport vehicle.

According to another advantageous feature of the present invention, at least one operating parameter of the lifting device, the drive system, the control system and/or the crane system can be set dependent upon the positions of the first, second, third and/or fourth markers and/or the first, second, third and/or fourth spacings by the control system of the crane system, in order to load the load automatically.

The computer unit can transfer information about the type of the transport vehicle, e.g. the length of the transport vehicle, or about the positions or spacings of the markers to the control system. Dependent thereon, the control system can then transfer a command as defined by the set operating parameters to the drive system, so that the load is loaded.

The at least one operating parameter involves, in particular, an extension length of the lifting device and/or a lowering height of the lifting device. The at least one operating parameter can also involve a lowering speed or a lifting speed and/or a rotary speed of the drive.

According to another aspect of the present invention, a crane system includes a lifting device, a camera system configured to generate at least one image data stream, a computer unit including an artificial neural network, the computer unit being configured to analyze the at least one image data stream with the assistance of the artificial neural network, in response to the analysis to recognize a first marker in a first single image of the at least one image data stream and to recognize a second marker in a second single image of the at least one image data stream, and to determine a position of the first marker and a position of the second marker, and a control system configured to operate the lifting device dependent upon the positions of the first and second markers for loading a load automatically.

The control system can be coupled, in particular, to the computer unit, via an Internet protocol (IP) connection for example.

The control system can include the computer unit entirely or partially, or vice versa.

According to another advantageous feature of the present invention, the crane system can include a drive system, with the control system controlling the drive system to move the lifting device. The drive system includes, in particular, a motor and a transmission.

According to another advantageous feature of the present invention, the control system can be configured to move the camera system during generation of the at least one image data stream along a longitudinal direction of a transport vehicle. The computer unit can be configured to determine the position of the first marker dependent upon a first momentary position of the camera system when the first marker has been recognized. The computer unit can be configured to determine the position of the second marker dependent upon a second momentary position of the camera system when the second marker has been recognized.

According to another advantageous feature of the present invention, the control system can be configured to control the drive system or a further drive system of the crane system in order to move the camera system along the longitudinal direction of the transport vehicle.

According to another advantageous feature of the present invention, the camera system can include a first camera arranged at a first end of the lifting device in order to generate a first image data stream of the at least one image data stream. The computer unit can be configured, for the analysis of the at least one image data stream, to analyze the first image data stream with the assistance of the neural network and to recognize the first marker on the basis of the analysis of the first image data stream. Thereby, the first momentary position corresponds to a momentary position of the first camera.

According to another advantageous feature of the present invention, the camera system can include a second camera arranged at a second end of the lifting device opposite the first end, in order to generate a second image data stream of the at least one image data stream. The computer unit can be configured, for the analysis of the at least one image data stream, to analyze the second image data stream with the assistance of the neural network and to recognize the second marker on the basis of the analysis of the second image data stream. The second momentary position thereby corresponds to a momentary position of the second camera.

According to another advantageous feature of the present invention, the camera system can include a third camera arranged at the first end of the lifting device, in order to generate a third image data stream, and a fourth camera arranged at the second end of the lifting device, in order to generate a fourth image data stream. The computer unit can be configured to analyze the third and fourth image data streams with the assistance of the neural network. The computer unit can be configured, on the basis of the analysis of the third image data stream, to recognize a third marker in a third single image of the third image data stream and, on the basis of the analysis of the fourth image data stream, to recognize a fourth marker in a fourth single image of the fourth image data stream. The computer unit can be configured to determine a position of the third marker dependent upon a third momentary position of the third camera when the third marker has been recognized and to determine a position of the fourth marker dependent upon a fourth momentary position of the fourth camera when the fourth marker has been recognized. The control system can be configured to drive the lifting device of the crane system dependent upon the positions of the first, second, third and fourth markers in order to bad the load automatically.

According to another advantageous feature of the present invention, the lifting device can have a rectangular or substantially rectangular base shape, with the first and second cameras being arranged at respective corners of the rectangular base shape.

According to another advantageous feature of the present invention, the third and fourth cameras can be arranged at further respective corners of the rectangular base shape. The four cameras are therefore arranged at four different corners of the rectangular base shape.

The lifting device can be configured, for example, as a container spreader. The lifting device can have, for example, an H-shaped or substantially rectangular telescopic frame, wherein the telescopic frame defines, for example, the rectangular base shape of the lifting device.

According to another advantageous feature of the present invention, the crane system can be configured as a container crane or container gantry crane, in particular for transferring or loading ISO containers.

Further embodiments of a crane system according to the present invention arise directly from the described configurations of a method according to the present invention for loading a load, and vice versa. In particular, individual features and corresponding explanations relating to the different embodiments of a method according to the present invention can be transferred analogously to corresponding embodiments of a crane system according to the present invention. For example, a crane system according to the present invention can be configured or programmed to carry out a method according to the present invention or the crane system carries out a method according to the present invention.

According to yet another aspect of the present invention, a training method for training a crane system for loading a load, in particular, for training a crane system in accordance with the present invention, or an artificial neural network for such a crane system or method is provided. For this purpose, a camera system of the crane system can generate at least one training image data stream and analyze it by an untrained or pre-trained artificial neural network. An operator is able to select reference single images from the at least one image data stream, on which markers of a pre-defined type are represented. The selected single images are pre-defined as a reference, in particular a positive reference for the neural network, in order to train the neural network.

According to another advantageous feature of the present invention, the crane system or the artificial neural network can be trained according to a training method in accordance with the present invention.

According to another advantageous feature of the present invention, a method for loading a load in accordance with the present invention includes the method steps of a training method for training a crane system for loading a load in accordance with the present invention. The image data stream is hereby used as a training data stream. The neural network can hereby advantageously be further trained during productive operation, so that the accuracy of the analysis in normal operation can be continuously improved.

According to another advantageous feature of the present invention, the crane system or the neural network of the crane system can be trained according to a training method in accordance with the present invention.

According to still another aspect of the present invention, a computer program is embodied in a non-transitory computer readable medium and stores commands, wherein the computer program, when loaded into a computer unit of a crane system and executed by the computer unit, causes the crane system to perform the steps of generating at least one image data stream by a camera system of the crane system, analyzing the at least one image data stream by the computer unit of the crane system on the basis of an artificial neural network, in response to the analysis of the at least one image data stream by the computer unit, recognizing a first marker in a first single image of the at least one image data stream and recognizing a second marker in a second single image of the at least one image data stream, determining by the computer unit a position of the first marker and a position of the second marker, and automatically loading the load by a lifting device of the crane system dependent upon the positions of the first and second markers.

According to another advantageous feature of the present invention, a computer-readable storage medium is provided on which a computer program in accordance with the present invention is stored.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
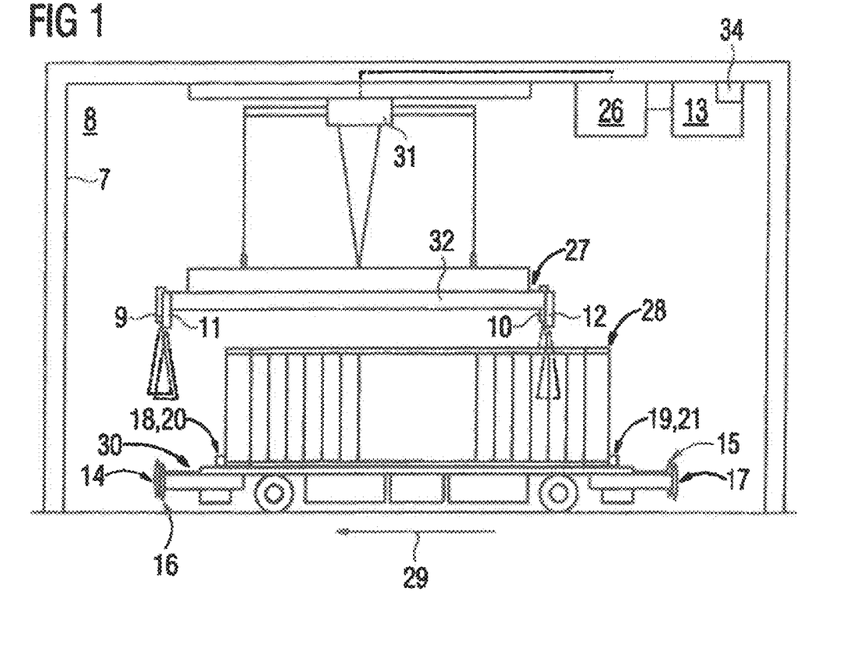
FIG. 1 is a schematic representation of an exemplary embodiment of a crane system according to the present invention.

Turning now to the drawing, and in particular to FIG. 1, there is shown a schematic representation of an exemplary embodiment of a crane system according to the present invention, generally designated by reference numeral 8. The crane system 8 is configured, for example, as a container crane and has, in particular, a frame 7. The crane system 8 also has a container spreader 27 which is movably connected, for example via a crane trolley 31, to the frame 7.

The crane system 8 also has a control system 26 which is configured to drive the crane trolley 31 for moving the container spreader 27. Furthermore, the control system 26 can drive the container spreader 27, for example, in such a way that an extension length of a telescopic frame 32 of the container spreader 27 can be set. In addition, the control system 26 can, for example, control a height of the container spreader 27.

The telescopic frame 32 of the container spreader 27 has, for example, a rectangular base shape. The crane system 8 has a camera 9, 10, 11, 12 at each corner of the telescopic frame 32, wherein the cameras 9, 10, 11, 12 are each arranged and aligned such that their direction of view is directed downwards, in particular, in a direction of a transport vehicle 30 which is configured in FIG. 1 as a train wagon for example.

The cameras 9, 10, 11, 12 can be accommodated, for example, in respective steel housings in order to keep any impact by rain or dirt to a minimum. For example, the cameras 9, 10, 11, 12 each have lenses with an angle of 20 to 26 degrees, in particular, approximately 22 degrees.

At a first end, the transport vehicle 30 has a first buffer 14 and a third buffer 16 and at an opposite second end, a second buffer 15 and a fourth buffer 17. The transport vehicle 30 can move, for example, along a longitudinal direction, indicated by arrow 29, of the transport vehicle 30 which corresponds, for example, to a rail direction.

The transport vehicle 30 carries, for example, a container 28, in particular a normed ISO container. For fixing or positioning the container 28 on the transport vehicle 30, the transport vehicle 30 optionally has a first load fixing means 18 and a third load fixing means 20 on the first end and a second load fixing means 19 and a fourth load fixing means 21 on the second end of the transport vehicle 30.

The crane system 8 includes a computer unit 13 which is coupled, for example, to the control system 26. An artificial neural network is stored on the computer unit 13. The neural network has been trained for pattern recognition in image data, in particular camera images. In particular, the neural network has been trained to recognize representations of the buffers 14, 15, 16, 17 and/or representations of the load fixing means 18, 19, 20, 21 in respective image data streams of the cameras 9, 10, 11, 12.

Furthermore, the computer unit 13 can have a computer-readable storage medium 34, on which a computer program according to the present invention is stored.

The mode of operation of the crane system 8 will now be described in greater detail with reference to FIGS. 2 and 3.

Figure 2:
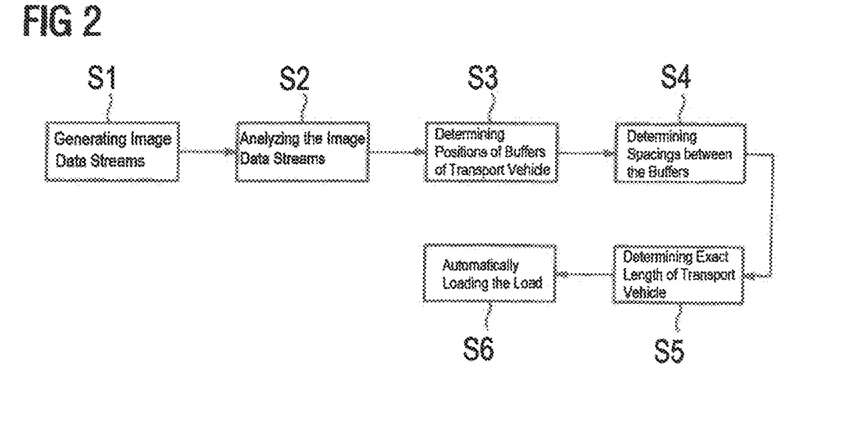
FIG. 2 is a schematic flow diagram of an exemplary embodiment of a method for loading a load in accordance with the present invention.

FIG. 2 shows a flow diagram of a method for loading a load in accordance with the present invention.

In step S1 of the method, the cameras 9, 10, 11, 12 generate respective image data streams. For this purpose, the container spreader 27 is moved over the transport vehicle 30, in particular along the longitudinal direction 29. The image data streams can be transferred, for example, by the respective camera signals as a live stream to the computer unit 13. The computer unit 13 can read in the image data streams digitally or analogously and in step S2 of the method, can analyze it with the assistance of the neural network.

The scan procedure in step S1 can be started, for example, by the control system 26 or an automation unit of the crane which is coupled to the computer unit 13 and the control system 26. It can thereby be ensured, for example, that the transport vehicle 30 is situated at a stationary position and is initially no longer moved, in particular during the entire scan procedure.

During the scan procedure, the computer unit 13 receives, for example, from the control system 26 or the automation unit, the respective central position of the container spreader 27. In particular, the computer unit 13 receives the central position of the container spreader 27 for each single image of the image data streams or for a pre-defined portion of the single images.

Depending on the rate at which the central position is prepared, a plurality of single images can also be assigned to the same central position. For example, the rate at which the central position is prepared can be selected dependent upon a scan rate, i.e., a movement speed of the container spreader 27.

For example, every 100 ms, the central position can be prepared when the speed of the container spreader 27 or the scan speed is 0.3 meters per second. This has proved to be advantageous for an accuracy of the process.

In step S2 of the method, the computer unit 13 analyzes the image data streams of the cameras 9, 10, 11, 12.

At a particular time point, for example, the first buffer 14 is located in the viewing direction of the first camera 9. The neural network recognizes in a corresponding single image of the associated image data stream that the pre-defined marker is imaged. Similarly, at corresponding time points, the second buffer 15 is situated in the viewing direction of the second camera 10, the third buffer 16 is situated in the viewing direction of the third camera 11 and the fourth buffer 17 is situated in the viewing direction of the fourth camera 12. The neural network recognizes the presence of a pre-defined marker in the corresponding image data streams.

In step S3, the computer unit 13 determines, corresponding positions of the buffers 14, 15, 16, 17 in relation to a reference coordinate system, which is fixed, by the frame 7 for example. For this purpose, the respective central positions of the buffers 14, 15, 16, 17 are calculated on the basis of the respectively set extension length of the container spreader 27 and the current central position of the container spreader 27. In the calculation of the central positions of the buffers 14, 15, 16, 17, optionally an arrangement of the markers can also be taken into account within the respective single images, in order to increase the accuracy.

In step S4, from the determined positions of the buffers 14, 15, 16, 17, corresponding spacings between the first buffer 14 and the second buffer 15 and between the third buffer 16 and the fourth buffer 17 are determined. By taking into account the detection results of the camera pairs of first and second camera 9, 10 and of third and fourth camera 11, 12, the process becomes very stable.

Based on the determined spacings, the computer unit 13 or the automation unit can determine in step S5 an exact length of the transport vehicle 30 and on the basis thereof, an exact type of the transport vehicle 30 can be determined, for example, by means of stored data in a database in the computer unit 13 or the automation unit.

In step S6, the information regarding the exact vehicle type can be used to load the load 28 automatically by the container spreader 27. For this purpose, dependent upon the container type, operational positions of the container spreader 27 or of the crane system 8 can be set. Alternatively or additionally, a logistical coordination of the loading can take place on the basis of the wagon type.

The corresponding information for automatic loading can be provided, for example, by the control system 26, the computer unit 13 or the automation unit or by a higher-level crane management system.

In place of the buffer 14, 15, 16, 17 or in addition thereto, the load fixing means 18, 19, 20, 21 can be used as pre-defined markers or patterns for recognizing the neural network.

Figure 3:
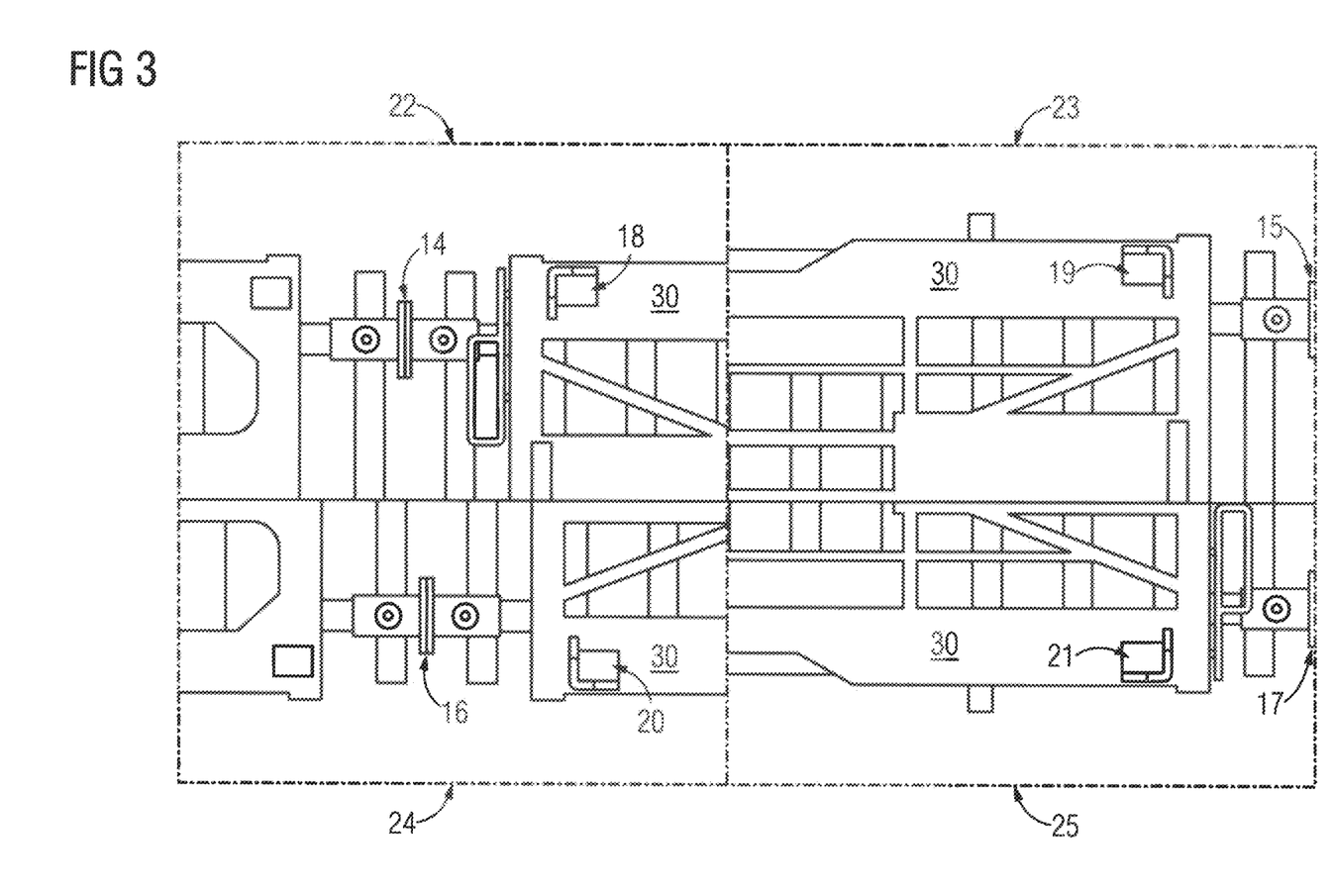
FIG. 3 shows exemplary single images of a further exemplary embodiment of a method according to the present invention.

FIG. 3 shows examples of single images 22, 23, 24, 25 captured by the cameras 9, 10, 11, 12, wherein the first single image 22 corresponds to a single image from the camera 9, the second single image 23 corresponds to a single image from the second camera 10, the third single image 24 corresponds to a single image from the third camera 11 and the fourth single image 25 corresponds to a single image from the fourth camera 12.

FIG. 3 shows by way of example the transport vehicle 30 without the load 28.

The single images 22, 23, 24, 25 can be, for example, training images for training the neural network during a training process in accordance with the present invention.

For the creation of training data for the training of the neural network, items of label information are assigned to the single images 22, 23, 24, 25, i.e. relevant information regarding where in the image the desired search pattern is located.

For the purpose of the training, the single images 22, 23, 24, 25 can be extracted, for example, directly from a video sequence, i.e. a corresponding training image data stream, and stored. For this purpose, for example, an operator can position bounding boxes at corresponding positions of the buffers 14, 15, 16, 17 or the load fixing means 18, 19, 20, 21 in order to adjust corresponding weights of the neural network.

Training of the neural network can be realized, for example, by a CPU or a GPU. The training can take place, for example, on the basis of a cloud computer or another computer system, externally to the crane system, since for training the neural network, large computing capacities can be required.

According to the present invention, a partially or completely automated loading of a load becomes possible by a crane system. Through the use of the neural network, a particularly high degree of reliability, safety and speed of the process is attained. In particular, it has been found that the marker positions can be determined in accordance with the present invention with an accuracy of 1-2 cm.

Disruptive influences can be further reduced when additional information from the crane automation system is available, such as e.g. type of the transport vehicle to be expected or a height of the transport vehicle to be expected or the load on the transport vehicle. With the aid of plausibility testing, falsely recognized positions which are caused, for example, by dirt or weather influences are rejected in order to increase the stability of the evaluation. This can be realized, for example, by the provision of the redundant camera pairs.

Examples of cameras include analogue or IP cameras. For remote control purposes, these cameras may already have been installed on the crane, so that no additional costs for hardware and installation are incurred for the cameras.

Further advantages of the present invention are relatively low acquisition costs and a small time cost for the commissioning and calibration of the system. A servicing cost is also low, due to the use of the cameras and possibly corresponding protective housings. Through the use of the neural network, a particularly high detection rate and reliability are achieved.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for loading of a load with a crane system, said method comprising:
   generating at least one image data stream by a camera system of the crane system;
   analyzing the at least one image data stream by a computer unit of the crane system based on an artificial neural network;
   in response to the analysis of the at least one image data stream by the computer unit, recognizing a first marker in a first single image of the at least one image data stream and recognizing a second marker in a second single image of the at least one image data stream;
   determining by the computer unit a position of the first marker and a position of the second marker; and
   automatically loading the load by a lifting device of the crane system dependent upon the positions of the first and second markers.

2. The method of claim 1, wherein the camera system is moved along a longitudinal direction of a transport vehicle as the at least one image data stream is generated.

3. The method of claim 2, further comprising in response to the analysis of the at least one image data stream, recognizing a buffer and/or a load fixing means of the transport vehicle as the first marker; and recognizing a further buffer and/or a further load fixing means of the transport vehicle as the second marker.

4. The method of claim 1, wherein the position of the first marker is determined by the computer unit dependent upon a first momentary position of the camera system when the first marker has been recognized, and wherein the position of the second marker is determined by the computer unit dependent upon a second momentary position of the camera system when the second marker has been recognized.

5. The method of claim 4, wherein generating the at least one image data stream includes generating a first image data stream by a first camera of the camera system, which first camera is arranged at a first end of the lifting device, with the first image data stream being analyzed by the computer unit with assistance of the artificial neural network, wherein the first marker is recognized by the computer unit based on the analysis of the first image data stream, and wherein the first momentary position corresponds to a momentary position of the first camera.

6. The method of claim 5, wherein generating the at least one image data stream includes generating a second image data stream by a second camera of the camera system, which second camera is arranged at a second end of the lifting device in opposition to the first end of the lifting device, with the second image data stream being analyzed by the computer unit with assistance of the artificial neural network, wherein the second marker is recognized by the computer unit based on the analysis of the second image data stream, and wherein the second momentary position corresponds to a momentary position of the second camera.

7. The method of claim 1, wherein the position of the first marker is determined by the computer unit dependent upon an arrangement of the first marker in the first single image, and wherein the position of the second marker is determined by the computer unit dependent upon an arrangement of the second marker in the second single image.

8. The method of claim 1, further comprising determining a spacing of the first and second markers from one another based on the positions of the first and second markers as determined by the computer unit, wherein the load is loaded by the lifting device dependent upon the spacing.

9. The method of claim 1, further comprising setting by a control system of the crane system an operating parameter of the lifting device or the crane system in dependence on the positions of the first and second markers for automatically loading the load.

10. A crane system, comprising:
a lifting device;
a camera system configured to generate at least one image data stream;
a computer unit including an artificial neural network, said computer unit being configured to analyze the at least one image data stream with assistance of the artificial neural network, in response to the analysis to recognize a first marker in a first single image of the at least one image data stream and to recognize a second marker in a second single image of the at least one image data stream, and to determine a position of the first marker and a position of the second marker; and
a control system configured to operate the lifting device dependent upon the positions of the first and second markers for loading a load automatically.

11. The crane system of claim 10, wherein the control system is configured to move the camera system along a longitudinal direction of a transport vehicle as the at least one image data stream is generated, said computer unit determining the position of the first marker dependent upon a first momentary position of the camera system when the first marker has been recognized, and determining the position of the second marker dependent upon a second momentary position of the camera system when the second marker has been recognized.

12. The crane system of claim 11, wherein the camera system includes a first camera arranged at a first end of the lifting device for generating a first image data stream of the at least one image data stream, said computer unit analyzing the first image data stream with the assistance of the artificial neural network and recognizing the first marker based on the analysis of the first image data stream, with the first momentary position corresponding to a momentary position of the first camera.

13. The crane system of claim 12, wherein the camera system includes a second camera arranged at a second end of the lifting device in opposition to the first end of the lifting device for generating a second image data stream of the at least one image data stream, said computer unit analyzing the second image data stream with the assistance of the artificial neural network and recognizing the second marker based on the analysis of the second image data stream, with the second momentary position corresponding to a momentary position of the second camera.

14. The crane system of claim 13, wherein the camera system includes a third camera arranged at the first end of the lifting device for generating a third image data stream of the at least one image data stream, and a fourth camera arranged at the second end of the lifting device for generating a fourth image data stream of the at least one image data stream, said computer unit analyzing the third image data stream and the fourth image data stream with the assistance of the artificial neural network, recognizing a third marker in a third single image of the third image data stream based on the analysis of the third image data stream, recognizing a fourth marker in a fourth single image of the fourth image data stream based on the analysis of the fourth image data stream, determining a position of the third marker dependent upon a third momentary position of the third camera when the third marker has been recognized, and determining a position of the fourth marker dependent upon a fourth momentary position of the fourth camera when the fourth marker has been recognized, said control system configured to operate the lifting device dependent upon the positions of the third and fourth markers for loading a load automatically.

15. The crane system of claim 13, wherein the lifting device has a substantially rectangular base shape, said first and second cameras being arranged at corners of the rectangular base shape.

16. A computer program embodied in a non-transitory computer readable medium and storing commands, wherein the computer program, when loaded into a computer unit of a crane system and executed by the computer unit, causes the crane system to perform steps of:
generating at least one image data stream by a camera system of the crane system;
analyzing the at least one image data stream by the computer unit of the crane system based on an artificial neural network;
in response to the analysis of the at least one image data stream by the computer unit, recognizing a first marker in a first single image of the at least one image data stream and recognizing a second marker in a second single image of the at least one image data stream:
determining by the computer unit a position of the first marker and a position of the second marker; and
automatically loading the load by a lifting device of the crane system dependent upon the positions of the first and second markers.

* * * * *